Feb. 15, 1949.                E. E. MODES                2,461,995
                       DIFFERENTIAL SCREW MICROMETER
                          Filed June 21, 1946
Fig. 1.
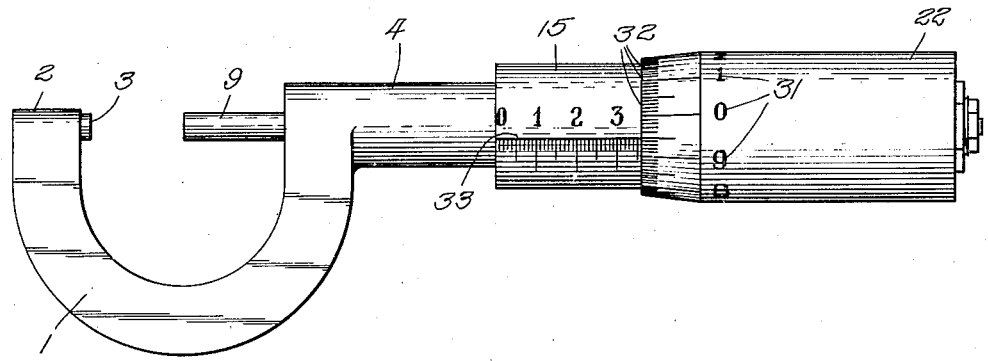
Fig. 2.
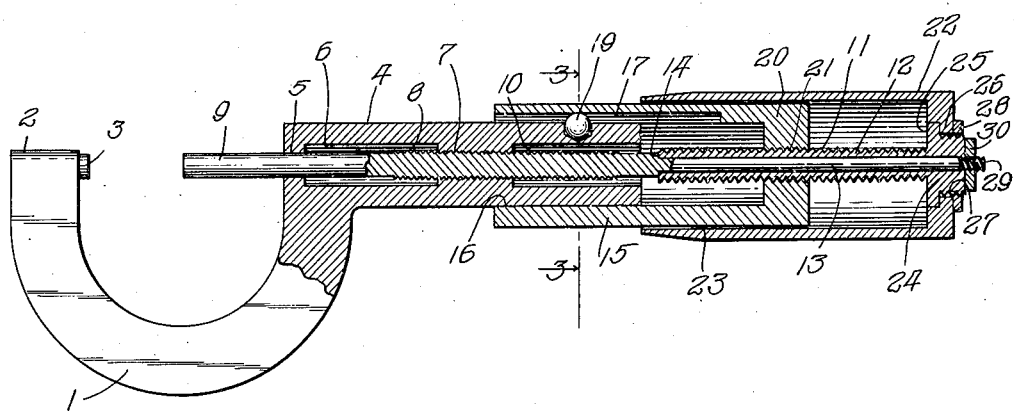
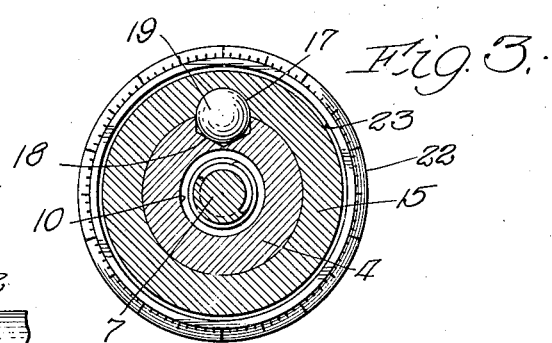
Fig. 3.
Fig. 4.
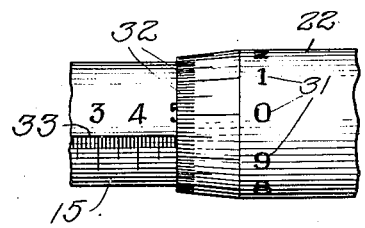
Inventor:
Edward E. Modes,
By Christy, Schroeder, Merriam, Hofgren,
    Attys.

Patented Feb. 15, 1949

2,461,995

UNITED STATES PATENT OFFICE 2,461,995

DIFFERENTIAL SCREW MICROMETER

Edward E. Modes, Chicago, Ill.

Application June 21, 1946, Serial No. 678,504

3 Claims. (Cl. 33—164)

This invention relates to micrometer calipers and similar measuring instruments for accurately measuring dimensions, and more particularly to the provision of means in such instruments for directly and easily reading the measurement in tens of thousandths of an inch.

Conventional micrometer calipers and the like, in use prior to my invention, reading to tens of thousandths of an inch, required the use of an additional pair of cooperating scales called a vernier for reading the tens of thousandths of an inch, which is not direct in that mating of corresponding lines is required. Also in the conventional micrometers the graduations were placed directly on the barrel, as a result of which the longitudinal movement of the thimble relatively to the barrel for a given change in measuring distance is equal to that change.

In said prior micrometers, when reading an indication, the tenths digit is read directly as the number of major divisions visible on the barrel, but the hundredths and thousandths digits must be arrived at by a process of adding multiples and a fraction of .025", and the ten-thousandths digit must be read from the vernier.

In the present invention I have overcome the above hazard of error, and labor of arriving at the final estimate of the measurement, by providing a multiplying sleeve which enables easily and quickly reading the correct measurement by merely counting the number of major divisions and subdivisions, no addition being involved and no vernier being required for the last digit. In other words the measurement .4995" is easily read directly from the graduations visible on the main measurement reading portion of the instrument.

Among the objects of the present invention are: to provide a novel and improved micrometer instrument; to provide such an instrument in which the measurement is read directly; to eliminate in such instrument the need of a vernier; to enable the correct reading of measurements by merely counting the divisions; to increase the number of graduations on the scale without interfering with the accuracy of the reading of the measured distance; and to provide an instrument of the type referred to that is easy and economical to manufacture and assemble, durable, efficient in operation, pleasing in appearance and positive and reliable in operation.

Other objects and advantages will become readily apparent from the following detailed description taken in connection with the accompanying drawing, wherein:

Fig. 1 is a side elevation of a micrometer caliper embodying my invention.

Fig. 2 is a longitudinal central section through the micrometer of Fig. 1, parts being shown in elevation for convenience.

Fig. 3 is a transverse section on the line 3—3 of Fig. 2.

Fig. 4 is a fragmentary side elevation of the scale showing a reading different than that of Fig. 1.

While my invention further resides in the combination, construction and arrangement of parts illustrated in the accompanying drawings, I have shown therein for illustrative purposes only, a preferred embodiment, and wish it understood that the same is susceptible of modification and change without departing from the spirit and scope of the appended claims.

In the form shown in the drawing my invention is shown as applied to a micrometer caliper comprising a U-shaped frame 1 having an anvil 2 which is provided with an anvil measuring face 3. Frame 1 extends rearwardly into the barrel 4 which is formed with a longitudinal bore 5 enlarged in diameter at 6 and at an intermediate portion is formed with the internal threads 7. Threadably mounted to interengage with threads 7 are similar threads 8 formed on a spindle 9 so that the rotation of spindle 9 in one direction will cause it to move toward the anvil measuring face 3 and rotation in the opposite direction will cause it to recede therefrom. Barrel 4 at its rear end is formed with an enlarged bore 10 of a diameter to freely receive the outermost edges of threads 11 formed upon the elongated sleeve 12 which is mounted upon the reduced diameter portion 13 integrally formed at the rear end of spindle 9. The reduced portion 13 at its forward end is formed with a shoulder 14 against which abuts the forward end of sleeve 12.

Threads 11 are of a greater lead than threads 8 for a reason more fully explained hereinafter. Mounted for longitudinal movement on barrel 4 is a multiplying sleeve 15 provided with a bore 16 of a size to permit said longitudinal sliding movement on barrel 4 but of close enough fit to prevent undue entry of dirt therebetween. Sleeve 15 is formed with an elongated groove 17 which as shown in Fig. 3 is semicircular in cross section. Barrel 4 is formed adjacent its rear end with a depression or cavity 18 which retains in rotatable captivity a spherical ball 19. This structure enables rotation of ball 19 in cavity 18 and at the same time facilitates longitudinal movement of sleeve 15 longitudinally of barrel 4.

To assist in reducing friction the cavity 18 is formed with nonspherical faces. Sleeve 15 is formed with a transverse wall at 20 having a concentric opening which is formed with internal threads 21 of a pitch to interengage threads 11, these threads as stated being of greater lead than threads 8. The sleeve 15 is elongated in order to provide sufficient exposed outer surface for a scale as hereinafter more fully explained. Rotatably and longitudinally movable upon sleeve 15 is a thimble 22 which at its forward end overlaps sleeve 15 a substantial distance, said forward end being beveled at 23 to provide a thinner forward edge for more readily reading the graduations thereon as later explained.

As seen in Fig. 2 sleeve 12 is at its rear end formed with an enlargement 24 having an annular shoulder 25 against which abuts annular shoulder 26 formed on thimble 22. Rearwardly (to the right as viewed in Fig. 2) of shoulder 25 the enlargement 24 is formed with screw threads 27 upon which is threadably mounted a nut 28 which when tightened against the outer face of the shoulder 26 on the thimble will grip the thimble and sleeve 12 for rotation together upon rotation of the thimble. The rear end (right hand end as viewed in Fig. 2) of the reduced portion 13 of spindle 9 is threaded at 29 to receive nut 30, so that when this nut is gripped against the adjacent face of the enlargement 24 of sleeve 12, rotation of this sleeve by thimble 22 will also rotate spindle 9. It is to be noted that when nut 28 is loosened, thimble 22 may be loosely rotated with relation to sleeves, and when nut 30 is loosened the thimble 22 and sleeve 12 will be rotatable with relation to the reduced portion 13 of spindle 9 for a purpose later more fully explained. In other words, loosening of nuts 28 and 30 will permit rotation of thimble 22, sleeve 12 and reduced portion 13 of spindle 9 with relation to each other for adjusting and setting purposes as later explained. When both of these nuts are tightened these parts will rotate together as a unit.

As stated above, threads 11 are of greater lead than threads 8. By using a .010" pitch or lead for threads 8 it is possible to divide the forward annular beveled edge of thimble 22 into ten major divisions, each equivalent to .001" change in measuring distance between the free end of spindle 9 and the measuring face 3 of the anvil 2. These 10 major divisions on the thimble 22 are indicated at 31 in Fig. 1. Each of these major divisions are subdivided into ten subdivisions 32, each equivalent to .0001" change in measuring distance without appreciably increasing the circumference of thimble 22 over that of the conventional size micrometer caliper. This means that both the thousandth digit and the ten-thousandth digit may be read directly upon the scale at the forward edge of thimble 22 without the use of a vernier.

Formed upon the side of the sleeve 15 is a longitudinal scale 33 of graduations which will be longer in longitudinal distance than if the threads 11 were not of greater lead than the threads 8. As will be understood in Fig. 2, the threads 11 being of greater lead than the threads 8, the sleeve 15 will move longitudinally along the surface of the barrel 4 toward the left (Fig. 2) when rotated in one direction at a greater rate than if threads 11 were of the same lead as threads 8, it being understood that threads 11 and threads 8 rotate fixedly together upon rotation of thimble 22, when both nuts 28 and 30 are tightened in place. While it is not essential that the lead of threads 11 be twice that of the lead of threads 8, I am, for illustrative purposes only, assuming such difference in lead in the drawings. By making the lead or pitch of threads 11 .020", the multiplying factor becomes .020 divided by .010 or 2. One turn of thimble 22 changes the measuring distance .010" between the end of spindle 9 and the anvil but the simultaneous relative distance of movement between the thimble and the sleeve is .020". This is because the thimble upon each revolution moves in one longitudinal direction .010" with relation to the barrel and at the same time the sleeve moves in the opposite direction .010" with relation to the barrel. This means that the relative distance of movement between the thimble and the sleeve is, in the present illustration twice that of the distance of movement between the end of the spindle and the anvil. This proportional movement may be changed by changing the difference in lead of threads 11 with relation to the lead of threads 8 as desired. This gives a readily readable minimum subdivision on the sleeve 15 for the hundredths digit. The major divisions on the scale 33 of sleeve 15 give the tenth digits and each of these major divisions are divided into ten subdivisions which give the hundredths readings.

Nuts 28 and 30 are for adjustment purposes. When assembling the parts together, the spindle 9 is screwed into the barrel 4 until the measuring distance between the end of spindle 9 and anvil 3 is zero, meaning these points being just contacted. The multiplying sleeve 15 is next slipped longitudinally over barrel 4 with groove 17 passing over the ball 19 which is rotatably seated in depression 18, and sleeve 12 is threaded into threads 21 in wall 20 of the multiplying sleeve 15. Thimble 22 is next slipped onto the enlarged portion 24 of sleeve 12 with the shoulders 25 and 26 in abutment and nuts 28 and 30 are then made tight. Nut 30 is then backed off slightly and sleeve 12 is then rotated in the sleeve 15 by rotation of thimble 22 until the zero mark on the multiplying sleeve 15 registers with the beveled edge of thimble 22. Nut 30 is then tightened and nut 28 loosened. Thimble 22 is then rotated with relation to sleeve 12 until the zero mark on the thimble registers with the longitudinal index line of scale 33 after which the nut 28 is tightened. The cooperating parts of the two scales now being in proper position and nuts 28 and 30 tightened, the readings may be then accurately read as the spindle moves rearwardly from its closed position and is adjusted in accordance with whatever measurement is being taken.

From the above description and the accompanying drawing it will be understood that the thimble and sleeve move in opposite directions and that the longitudinal movement of the multiplying sleeve 15 relative to the thimble 22 will be an increased amount because of the lead of threads 11 being greater than the lead of threads 8. The fact that sleeve 15 is nonrotatable but longitudinally slidable with relation to the barrel means that for any lead of threads 11 greater than the lead of threads 8 the sleeve will move longitudinally in the opposite direction from that of the thimble and that the relative difference in movement between these parts will be greater than the movement of the spindle 9. This enables a greater number of graduations on the longitudinal measuring scale which makes possible a much more easy reading of the tenths and hundredths graduations and a direct reading on the front edge of the thimble 22 of the thousandths and ten-thousandths graduations.

I claim:

1. In a micrometer measuring instrument, a barrel, a spindle having small lead threads engaging complemental threads in the barrel, a thimble, a multiplying sleeve between the barrel and thimble, a threaded sleeve mounted on said spindle and having threads of a lead greater than that of the first mentioned threads, said greater lead threads engaging complemental threads in the multiplying sleeve, said threaded sleeve being releasably locked to both the thimble and the spindle.

2. A micrometer measuring instrument as claimed in claim 1, having means for preventing rotation of the multiplying sleeve with relation to the barrel and providing for longitudinal movement thereof as the spindle is rotated by the thimble.

3. A micrometer measuring instrument as claimed in claim 1, in which the releasable locking means comprises a pair of nuts one of which threadably engages said threaded sleeve and the other of which threadably engages the end of the spindle.

EDWARD E. MODES.

REFERENCES CITED

The following references are of record in the file of this patent:

UNITED STATES PATENTS

| Number | Name | Date |
|---|---|---|
| 890,590 | Anderson | June 16, 1908 |
| 1,001,471 | Spaulding | Aug. 22, 1911 |
| 2,267,332 | Hagstrom | Dec. 23, 1941 |

FOREIGN PATENTS

| Number | Country | Date |
|---|---|---|
| 5,080 | Great Britain | Dec. 17, 1900 |
| 8,798 | Great Britain | Oct. 2, 1906 |